United States Patent Office 3,516,998
Patented June 23, 1970

3,516,998
4-AMINO-2-ARYL-7-ALKYLAMINO-6-
PTERIDINECARBOXAMIDINES
Thomas S. Osdene, Richmond, Va., and Arthur A. Santilli,
Havertown, Pa., assignors to American Home Products
Corporation, New York, N.Y., a corporation of
Delaware
No Drawing. Filed Sept. 22, 1966, Ser. No. 581,154
Int. Cl. C07d 87/40
U.S. Cl. 260—247.5                                      6 Claims

ABSTRACT OF THE DISCLOSURE

A compound of the formula

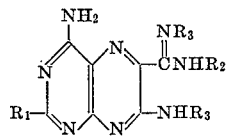

wherein $R_1$ is phenyl, halophenyl, alkyl-or alkoxy-phenyl, trifluoromethylphenyl, thienyl; $R_2$ is hydrogen, lower alkyl, lower alkoxy $(X)_1$ di(lower)alkylamino $(X)$, lower alkylthio $(X)$, morpholino $(X)$, piperidino $(X)$, and N-(lower)alkylpiperazino $(X)$, wherein X is alkylene; $R_3$ is lower alkyl. The compounds exhibit anti-inflammatory and anti-bacterial activity.

---

This invention relates to new and novel pteridinecarboxamidines. In particular, it is concerned with 4-amino-2-aryl-7-alkylamino-6 - pteridinecarboxamidines having pharmacological activity.

The new and novel compounds which are included within the scope of this invention are represented by the following formula:

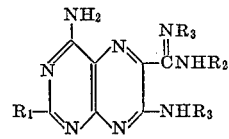

wherein $R_1$ is selected from the group consisting of phenyl, thienyl, halophenyl, lower alkylphenyl, lower alkoxyphenyl and trifluoromethylphenyl; $R_2$ is selected from the group consisting of hydrogen, lower alkyl, lower alkoxy(X), di(lower)alkylamino(X), lower alkylthio(X), morpholino(X), piperidino(X), and N-(lower)alkylpiperazano(X), wherein (X) is lower alkyl containing at least two carbon atoms; and $R_3$ is lower alkyl.

Examples thereof are:

4-amino-N'-(iso-butyl)-7-(iso-butylamino)-N-(2-morpholinoethyl)-2-phenyl-6-pteridinecarboxamidine;
4-amino-N,N'-diethyl-2-(2-ethoxyphenyl)-7-ethylamino-6-pteridinecarboxamidine; and
4-amino-N-(2-ethoxyethyl)-N'-(2-ethylbutyl)-7-(2-ethylbutylamino)-2-(2-thienyl)-6-pteridinecarboxamidine.

The compounds of the present invention may be prepared by the reaction of an amine with an appropriate pteridinethiocarboxamide, as exemplified by the following scheme:

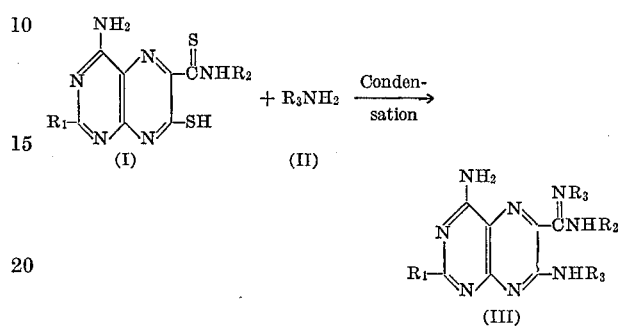

wherein $R_1$, $R_2$ and $R_3$ are defined as above. The reaction is effected by admixing an appropriate 4-amino-2-aryl-7-mercapto-6-pteridinethiocarboxamide (I) with an excess amount of an alkyl amine (II) and heating the resulting mixture at about reflux temperatures for a period of about six to fifteen hours. Preferably, this reaction is conducted at the reflux temperature of the reaction mixture for ten hours.

After the reaction is complete, the product is separated from the reaction mixture by conventional means such as filtration, evaporation and crystallization from a suitable solvent.

The amines employed in the process of this invention are known compounds which are readily available from commercial sources which can also be prepared in accord with standard organic procedures well known to those skilled in the art. The pteridinethiocarboxamides reactants are described and prepared by the procedure disclosed in co-pending application Ser. No. 519,212, filed on Jan. 7, 1966, now Pat. No. 3,278,533 issued on Oct. 11, 1966.

The time and temperature ranges utilized in the above mentioned reactions are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

In accord with the present invention, the petridinecarboxamidines herein described have been found to possess interesting pharmaceutical properties which render them useful as synthetic medicinals. More particularly, these compounds, in standard pharmacological tests, have exhibited utility as anti-inflammatory and anti-bacterial agents.

When the compounds of this invention are employed as anti-inflammatory and anti-bacterial agents, they may be administered alone or in combination with pharmaceutically acceptable carriers, the proportion of which is determined by the solubility and chemical nature of the compound, chosen route of administration and standard pharmaceutical practice. For example, they may be administered oraly in the form of tablets or capsules containing such excipients as starch, milk sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administrated orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 5 mg. to about 50 mg. per kg. of body weight per day, although as aforementioned variations will occur. However, a dosage level that is in the range of from about 10 mg. to about 30 mg. per kg. of body weight per day is most desirably employed in order to achieve effective results.

The following examples are given by way of illustration:

Example I

A mixture of 2.0 g. of 4-amino-7-mercapto-M-C$_2$-methoxyethyl) - 2-phenyl-6-pteridinethiocarboxamide and 20 ml. of n-butyl amine is heated at reflux temperatures for ten hours and allowed to cool. Thereafter, the reaction mixture is filtered, the filterate evaporated to dryness and the residue recrystallized from aqueous Cellosolve to afford 4-amino-N'-butyl-7-butylamino-N-(2-methoxyethyl) - 2 - phenyl-6-pteridinecarboxamidine, M.P. 228° C.

Analysis.—Calc'd for $C_{24}H_{34}ON_8$ (percent): C, 63.97; H, 7.61; N, 24.87. Found (percent): C, 63.74; H, 7.28; N, 25.06.

Example II

A mixture of 5.0 g. of 4-amino-7-mercapto-N-(2-morpholinoethyl) - 2-phenyl-6-pteridinethiocarboxamide and 60 ml. of iso-butyl amine is heated at 65° C. for eight hours and allowed to cool. Thereafter, the reaction mixture is filtered, the filtrate evaporated to dryness and the residue recrystallized from aqueous ethanol to afford 4 - amino - N'-(iso-butyl)-7-(iso-butylamino)-N-(2-morpholinoethyl)-2-phenyl-6-pteridinecarboxamidine.

In a similar manner, reacting 4-amino-2-(4-bromophenyl) - 7 - mercapto-N-(3-morpholinopropyl)-6-pteridinethiocarboxamide with iso-butyl amine produces 4-amino-2-(4-bromophenyl) - N' - (iso-butyl)-7-(iso-butylamino) - N - (3 - morpholinopropyl)-6-pteridinecarboxamidine.

Example III

Repeating the procedure of Examples I and II to react the following 4-amino-7-mercapto-6-pteridinethiocarboxamides with an appropriate alkyl amine, the hereinafter listed products are obtained:

| Starting materials | Products |
|---|---|
| 4-amino-N-ethyl-2-(2-ethoxyphenyl)-7-mercapto-6-pteridinethiocarboxamide and ethyl amine. | 4-amino-2-(2-ethoxyphenyl)-N,N'-diethyl-7-ethylamino-6-pteridinecarboxamidine. |
| 4-amino-7-mercapto-2-phenyl-N-(2-piperidinoethyl)-6-pteridinethiocarboxamide and propyl amine. | 4-amino-2-phenyl-N-(2-piperidinoethyl)-N'-propyl-7-propylamino-6-pteridinecarboxamidine. |
| 4-amino-7-mercapto-N-[2-(N-methylpiperazino)ethyl]-2-phenyl-6-pteridinethiocarboxamide and ethyl amine. | 4-amino-N'-ethyl-7-ethylamino-N-[2-(N-methylpiperazino)ethyl]-2-phenyl-6-pteridinecarboxamidine. |
| 4-amino-2-(4-butoxyphenyl)-N-hexyl-7-mercapto-6-pteridinethiocarboxamide and hexyl amine. | 4-amino-2-(4-butoxyphenyl)-N,N'-dihexyl-7-hexylamino-6-pteridinecarboxamidine. |
| 4-amino-N-(3-diethylaminopropyl)-7-mercapto-2-phenyl-6-pteridinethiocarboxamide and 2-ethyl butyl amine. | 4-amino-N-(3-diethylaminopropyl)-N'-(2-ethylbutyl)-7-(2-ethylbutylamino)-2-phenyl-6-pteridinecarboxamidine. |
| 4-amino-N-(6-diethylaminohexyl)-7-mercapto-2-phenyl-6-pteridinethiocarboxamide and iso-propyl amine. | 4-amino-N-(6-diethylaminohexyl)-N'-(iso-propyl)-7-(iso-propylamino)-2-phenyl-6-pteridinecarboxamidine. |
| 4-amino-7-mercapto-N-(2-methoxyphenyl)-2-phenyl-6-pteridinethiocarboxamide and ethyl amine. | 4-amino-N'-ethyl-7-ethylamino-N-(2-methoxyphenyl)-2-phenyl-6-pteridinecarboxamidine. |

Example IV

A mixture of 0.5 g. of 4-amino-N-ethyl-2-(3-iodophenyl)-7-mercapto-6-pteridinethiocarboxamide and 5 ml. of sec-butyl amine is heated at 40° C. for ten hours and allowed to cool. Thereafter, the reaction mixture is filtered, the filtrate evaporated to dryness and the residue recrystallized from aqueous Cellosolve to afford 4-amino-N'-(sec-butyl) - 7-(sec-butylamino)-N-ethyl-2-(3-iodophenyl)-6-pteridinecarboxamidine.

Similarly, 4-amino-N'-butyl-7-butylamino-N-(4-methylthiobutyl)-2-phenyl-6-pteridinecarboxamidine;

4-amino-N-(3-butylthiopropyl)-N'-ethyl-7-ethylamino-2-phenyl-6-pteridinecarboxamidine and 4-amino-N-(3-ethylthiopropyl)-N'-heptyl-7-heptyl-amino-2-phenyl-6-pteridinecarboxamidine are produced.

Example V

A mixture of 2.0 g. of 4-amino-N-(2-ethoxyethyl)-7-mercapto - 2 (2-thienyl)-6-pteridinethiocarboxamide and 20 ml. of 2-ethyl butyl amine is heated at 120° C. for five hours and allowed to cool. Thereafter, the reaction mixture is filtered, the filtrate evaporated to dryness and the residue recrystallized from aqueous Cellosolve to afford 4 - amino - N - (2-ethoxyethyl)-N'-(2-ethylbutyl)-7-(2-ethylbutylamino) - 2 - (2-thienyl)-6-pteridinecarboxamidine.

In the same manner, reacting 4-amino-7-mercapto-N-pentoxyethyl-2-(4-tolyl)-6-pteridinethiocarboxamide with ethyl amine produces 4-amino-N'-ethyl-7-ethylamino-N-pentoxyethyl-2-(4-tolyl)-6-pteridinecarboxamidine.

Example VI

A mixture of 1.0 g. of 4-amino-2-(4-chlorophenyl)-N - (2 - ethoxyethyl)-7-mercapto-6-pteridinethiocarboxamide and 10 ml. of propyl amine is heated at reflux temperatures for seven hours and allowed to cool. Thereafter, the reaction mixture is filtered, the filtrate evaporated to dryness and the residue recrystallized from aqueous ethanol to afford 4-amino-2-(4-chlorophenyl)-N-(2-ethoxyethyl) - N' - propyl-7-propylamino-6-pteridinecarboxamidine.

Similarly, 4-amino-N-(2-ethoxyethyl)-N'-ethyl-7-ethyl-amino-2 - (4-ethylphenyl)-6-pteridinecarboxamidine and 4-amino-N'-ethyl-7-ethylamino-N - (6 - propoxyhexyl)-6-pteridinecarboxamidine are synthesized.

Example VII

A mixture of 20 g. of 4-amino-N-ethyl-7-mercapto-2-phenyl-6-pteridinethiocarboxamide and 200 ml. of ethyl amine is heated at reflux temperatures for ten hours and allowed to cool. Thereafter, the reaction mixture is filtered, the filtrate evaporated to dryness and the residue recrystallized from aqueous-ethanol to afford 4-amino-N,N'-diethyl-7 - ethylamino-2-phenyl-6-pteridinecarboxamidine.

Utilizing the above procedure, the following compounds are produced:

4-amino-N'-ethyl-7-ethylamino-N-methyl-2-phenyl-6-pteridinecarboxamidine;
4-amino-N'-heptyl-7-heptylamino-N-methyl-2-(3-thienyl)-6-pteridinecarboxamidine;
4-amino-N,N'-diethyl-7-ethylamino-2-(4-trifluoromethylphenyl)-6-pteridinecarboxamidine; and
4-amino-N,-N'-dibutyl-7-butylamino-2-(4-propylphenyl)-6-pteridinecarboxamidine.

Example VIII

A mixture of 2.0 g. of 4-amino-N-[2-(N-amylpiperazino)ethyl]-7-mercapto-2-phenyl-6 - pteridinethiocarboxamide and 20 ml. of ethyl amine is heated at reflux temperatures for twelve hours and allowed to cool. There after, the reaction mixture is filtered, the filtrate evaporated to dryness and the residue recrystallized from aqueous Cellosolve to afford 4-amino-N-[2-(N-amylpiperazino) ethyl]-N'-ethyl-7-ethylamino-2-phenyl-6-pteridinecarboxamidine.

Similarly, 4-amino-N'-ethyl-7-ethylamino-2-phenyl - N-(4-piperidinobutyl) - 6 - pteridinecarboxamidine and 4-amino - N-[2-(N-amylpiperazino)ethyl]-N'-ethyl-7-ethylamino-2-phenyl-6-pteridinecarboxamidine are synthesized.

Example XI

A mixture of 1.0 g. of 4-amino-7-mercapto-N-(4-morpholinobutyl) - 2-phenyl-6-pteridinethiocarboxamide and 10 ml. of n-propyl amine is heated at 47° C. for ten hours and allowed to cool. Thereafter, the reaction mixture is filtered, the filtrate evaporated to dryness and the residue recrystallized from aqueous ethanol to afford 4-amino-N - (4 - morpholinobutyl)-2-phenyl-N'-propyl-7-propylamino-6-pteridinecarboxamidine.

In the same manner, the following pteridinecarboxamidines are produced:

4-amino-N-[3-(N-butylpiperazino)propyl]-N'-ethyl-7-ethylamino-2-phenyl-6-pteridinecarboxamidine;
4-amino-2-phenyl-N,-N'-dipropyl-7-propylamino-N-(N-propylpiperazinomethyl)-6-pteridinecarboxamidine;
4-amino-N-(2-methoxyethyl)-2-phenyl-N'-propyl-7-propylamino-6-pteridinecarboxamidine;
4-amino-N'-ethyl-7-ethylamino-N-(dimethylaminoethyl)-2-phenyl-6-pteridinecarboxamidine; and
4-amino-N-(2-dibutylaminoethyl)-2-phenyl-N'-(iso-propyl)-7-(iso-propylamino)-6-pteridinecarboxamidine.

Example X

A mixture of 0.5 g. of 4 - amino - 7 - mercapto-N-(2 - morpholinoethyl) - 2 - (4 - tolyl) - 6 - pteridinethiocarboxamide and 5 ml. of 2-ethyl butyl amine is heated at 120° C. for eight hours and allowed to cool. Thereafter, the reaction mixture is filtered, the filtrate evaporated to dryness and the residue recrystallized from aqueous Cellosolve to afford 4 - amino - N' - (2 - ethylbutyl) - 7 - (2 - ethylbutylamino) - N - (2 - morpholinoethyl)-2-(4-tolyl)-6-pteridinecarboxamidine.

Example XI

The procedure of the previous examples is repeated to prepare the following pteridinecarboxamidines from the corresponding pteridinethiocarboxamides:

4-amino-N-(2-ethoxyethyl)-N'-hexyl-7-hexylamino-2-phenyl-6-pteridinecarboxamidine;
4-amino-N-(3-ethylthiopropyl)-N'-heptyl-7-heptylamino-2-phenyl-6-pteridinecarboxamidine;
4-amino-2-(3-trifluoromethylphenyl)-N-(2-methoxyethyl)-N'-propyl-7-propylamino-6-pteridinecarboxamidine;
4-amino-N'-ethyl-7-ethylamino-N-(4-methoxybutyl)-2-phenyl-6-pteridinecarboxamidine;
4-amino-N-(2-dibutylaminoethyl)-N'-ethyl-7-ethylamino-2-(4-propylphenyl)-6-pteridinecarboxamidine;
4-amino-N'-ethyl-7-ethylamino-N-(3-diethylaminopropyl)-2-phenyl-6-pteridinecarboxamidine;
4-amino-N,N'-diethyl-7-ethylamino-2-(2-thienyl)-6-pteridinecarboxamidine;
4-amino-N'-butyl-7-butylamino-N-(2-ethylthioethyl)-2-(4-methoxyphenyl)-6-pteridinecarboxamidine; and
4-amino-2-(2-ethoxyphenyl)-N-ethyl-N'-propyl-7-propylamino-6-pteridinecarboxamidine.

Example XII

A mixture of 4.0 g. of 4 - amino - 2 - (4 - iodophenyl)- 7 - mercapto - N - (3 - morpholinopropyl) - 6 - pteridinethiocarboxamide and 40 ml. of iso-butyl amine is heated at 65° C. for fourteen hours and allowed to cool. Thereafter, the reaction mixture is filtered, the filtrate evaporated to dryness and the residue recrystallized from aqueous Cellosolve to afford 4 - amino - N' - (iso-butyl)-7 - (iso-butylamino) - 2 - (4 - iodophenyl) -N - (3 - morpholinopropyl)-6-pteridinecarboxamidine.

Similarly, reacting 4 - amino - 7 - mercapto - N - piperidinomethyl - 6 - pteridinethiocarboxamide with ethyl amine produces 4 - amino - N' - ethyl - 7 - ethylamino-N-piperidinomethyl-6-pteridinecarboxamidine.

Example XIII

A mixture of 1.0 g. of 4 - amino - N - hexyl - 7 - mercapto - 2 - (4 - methoxyphenyl) - 6 - pteridinethiocarboxamide and 10 ml. of ethyl amine is heated at reflux temperatures for ten hours and allowed to cool. Thereafter, the reaction mixture is filtered, the filtrate evaporated to dryness and the residue recrystallized from aqueous Cellosolve to afford 4 - amino - N' - ethyl-7-ethylamino - N - hexyl - 2 - (4 - methoxyphenyl)-6-pteridinecarboxamidine.

Example XIV

The procedure of the aforesaid examples is again repeated to react an appropriate alkyl amine with a pteridinethiocarboxamide to prepare the hereinafter listed pteridinecarboxamidines:

4-amino-N'-(sec-butyl)-7-(sec-butylamino)-N-(4-methoxybutyl)-2-phenyl-6-pteridinecarboxamidine;
4-amino-N'-ethyl-7-ethylamino-2-phenyl-N-(2-piperidinoethyl)-6-pteridinecarboxamidine;
4-amino-N'-butyl-7-butylamino-N-[2-(N-methylpiperazino)ethyl]-2-(4-chlorophenyl)-6-pteridinecarboxamidine;
4-amino-N'-ethyl-7-ethylamino-2-(4-butoxyphenyl)-N-hexyl-6-pteridinecarboxamidine;
4-amino-N'-ethyl-7-ethylamino-N-(3-diethylaminopropyl)-2-(4-bromophenyl)-6-pteridinecarboxamidine;
4-amino-N-(6-diethylaminohexyl)-N'-propyl-7-propylamino-2-phenyl-6-pteridinecarboxamidine;
4-amino-2-(4-fluorophenyl)-N,N'-dihexyl-7-hexylamino-6-pteridinecarboxamidine; and
4-amino-N'-butyl-7-butylamino-N-ethyl-2-(2-hexylphenyl)-6-pteridinecarboxamidine.

What is claimed is:
1. A compound selected from the group consisting of those having the formula:

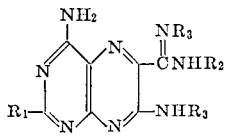

wherein $R_1$ is selected from the group consisting of phenyl, thienyl, halophenyl, lower alkylphenyl, lower alkoxyphenyl and trifluoromethylphenyl; $R_2$ is selected from the group consisting of lower alkoxy(X), di(lower)alkylamino(X), lower alkylthio(X), morpholino(X), piperidino(X), and N-(lower)alkylpiperazino(X), wherein (X) is lower alkyl containing at least two carbon atoms; and $R_3$ is lower alkyl.

2. A compound as described in claim 1 which is: 4 - amino - N'-butyl-7-butylamino-N-(2-methoxyethyl)-2-phenyl-6-pteridinecarboxamidine.

3. A compound as described in claim 1 which is: 4 - amino - N' - (iso-butyl)-7-(iso-butylamino)-N-(2-morpholinoethyl) - 2 - phenyl-6-pteridinecarboxamidine.

4. A compound as described in claim 1 which is: 4-amino - N - (2 - ethoxyethyl)-N'-(2-ethylbutyl)-7-(2-ethyl-butyl-amino)-2-(2-thienyl)-6-pteridinecarboxamidine.

5. A compound as described in claim 1 which is: 4-amino - 2 - (4 - chlorophenyl) - N - (2-ethoxyethyl)-N'-propyl - 7 - propylamino-6-pteridinecarboxamidine.

6. A compound as described in claim 1 which is: 4-amino - 2 - (4 - bromophenyl)-N'-(iso-butyl)-7-(iso-butylamino) - N - (3 - morpholinopropyl)-6-pteridine-carboxamidine.

References Cited
UNITED STATES PATENTS 3,012,034  12/1961  Taylor _____ 260—251.5

NICHOLAS S. RIZZO, Primary Examiner

R. V. RUSH, Assistant Examiner

U.S. Cl. X.R.

260—247.1, 251.5; 424—248, 251

PO-1050
(5/69)

UNITED STATES PATENT OFFICE
CERTIFICATE OF CORRECTION

Patent No. 3,516,998  Dated June 23, 1970

Inventor(s) Thomas S. Osdene and Arthur A. Santilli

It is certified that error appears in the above-identified patent and that said Letters Patent are hereby corrected as shown below:

Column 3, line 44, "4-amino-7-mercapto-M-$C_2$-" should read -- 4-amino-7-mercapto-N-(2- --; and in the same column, line 48, "filterate" should read -- filtrate --.

SIGNED AND SEALED
OCT 20 1970

(SEAL)
Attest:

Edward M. Fletcher, Jr.
Attesting Officer

WILLIAM E. SCHUYLER, JR.
Commissioner of Patents